March 10, 1964  K. STEIMEL  3,123,980
METHOD AND APPARATUS FOR REGULATING HEAT TRANSFER
Filed Dec. 18, 1961

Inventor:
KARL STEIMEL
By Toulmin & Toulmin
Attorneys

United States Patent Office 3,123,980
Patented Mar. 10, 1964

3,123,980
METHOD AND APPARATUS FOR REGULATING HEAT TRANSFER
Karl Steimel, Konigstein-Johanniswald, Taunus, Germany, assignor to Licentia Patent-Verwaltungs-G.m.b.H., Frankfurt am Main, Germany
Filed Dec. 18, 1961, Ser. No. 160,138
Claims priority, application Germany Dec. 23, 1960
10 Claims. (Cl. 62—3)

The present invention relates to thermoelectric heating or cooling, more particularly, to a method and apparatus for regulating the thermoelectric transfer of heat between two bodies.

The development of semiconductors into the present advanced state has made it possible to produce thermocouple elements which can be used for the transfer of heat from one body to another by utilization of the Peltier effect. While the applications of thermoelectric heating or cooling are virtually unlimited, it is particularly adapted for those smaller installations wherein the power consumed is equal to or less than the power consumed by a conventional home refrigerator. For such smaller installations, however, accessory equipment such as current regulating and controlling structures constitute a considerably high percentage of the total cost for the entire installation. It is therefore preferable to employ as such auxiliary devices simple structures whose costs are relatively low. By way of example, the conventional home refrigerator has only a temperature-responsive on-off switch as a regulator which comprises the auxiliary equipment.

In those thermoelectric applications wherein it is desired to transfer larger quantities of heat within short periods of time, the simple on-off switch would be inadequate and accordingly the operation of the installation would no longer be economical. At the same time a more complicated and advanced regulating structure would not permit the installation to be manufactured economically.

It is therefore the principal object of the present invention to provide a novel and improved method and apparatus for regulating the transfer of heat by the Peltier effect between two bodies.

It is a further object of the present invention to provide a method for regulating the electric current in a thermoelectric heat transfer arrangement wherein heat is transferred from one reservoir to another by utilizing the Peltier effect.

The present invention discloses a method for operating a heat transfer arrangement as described above which essentially comprises initially operating the heat transfer arrangement at that electric current wherein the maximum transfer of heat occurs between the bodies. When predetermined temperature conditions, such as a predetermined temperature differential between the bodies or a predetermined temperature of one of the bodies are attained, then the heat transfer arrangement is operated at that electric current at which the arrangement operates most efficiently. Since the latter current is less than the initial current, it can be appreciated that this process is considerably more economical than previously proposed methods of operating such an arrangement.

By employing this process it can be seen that with the initial relatively high transfer of heat in the first stage of the process, the predetermined temperature conditions are quickly attained. However, once these conditions are attained, then the rate of heat transfer can be less in order to maintain these temperature conditions. However, this lower rate of heat transfer is that point at which the thermoelectric arrangement operates most efficiently.

Other objects and advantages of the present invention will be apparent upon reference to the accompanying description when taken in conjunction with the following drawings, wherein FIGURE 1 is a graph containing several curves relating to the total quantity of heat transfer and the efficiency of the thermoelectric arrangement with respect to the electric current passing therethrough;

It is to be emphasized that the process of this invention can be employed in the transfer of heat between two bodies which are maintained at different temperatures. However, in order to clarify the description of this invention the process will be described as applied to a conventional household refrigerator wherein the interior of the refrigerator enclosure is the cold body and the atmosphere surrounding the refrigerator is the hot body.

Figure 1:
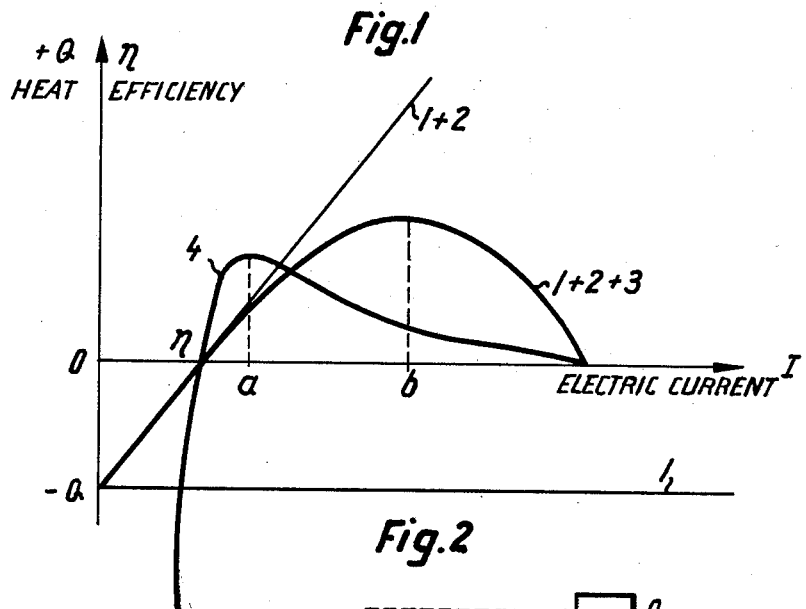

With particular reference to FIGURE 1 the abscissa of the graph illustrated therein represents the electric current (I) passed through a thermoelectric assembly comprising a plurality of dissimilar thermoelectric elements electrically connected to provide a plurality of hot junctions and a plurality of cold junctions upon the passage therethrough of electric current in a predetermined direction. The ordinate axis of the graph has two scales thereon wherein one scale represents the quantity of heat (Q) and the other scale represents the efficiency of the thermoelectric assembly ($\eta$).

The heat transfer curves shown herein will vary somewhat according to the particular thermocouple structure employed, but the curves will all be basically similar to the curves illustrated.

Considering two bodies which are at different temperatures which are interconnected by a thermoelectric assembly, it will be apparent that there will be a transfer of heat from the hot body to the cold body independent of the current flowing through the thermoelectric elements. This flow of heat will occur through various existing heat bridges in an effort to compensate for the difference in temperatures between the two bodies. Based on the assumption that there is a constant temperature differential between the hot and cold bodies, the transfer of heat between these two bodies independent of the electric current is represented by the horizontal line which is curve 1 on the graph. In the example of a refrigerator, the heat flow will be from the atmosphere to the interior of the refrigerator.

By passing an electric current through the thermoelectric assembly, the effects of this heat transfer will be compensated by the transfer of heat from the cold body (refrigerator enclosure) to the hot body (the atmosphere). As the current increases, the quantity of heat removed from the refrigerator enclosure will also increase as indicated by the curve 1+2.

As the current is increased to the value $n$, the heat being removed from the interior of the refrigerator will be equal to the heat being transferred from the atmosphere into the refrigerator. As the current is increased beyond this value $n$, the net result will be the removal of heat from the interior of the refrigerator and the lowering of the temperature thereof.

However, as the electric current is passed through the thermoelectric assembly, heat will be given off by the thermoelectric assembly due to the $I^2R$ loss which is termed the joulean heat. Since this heat increases as the square of the current, the total heat transfer as the current is increased is represented by the curve 1+2+3. Thus, when the current has the value of $b$, the total heat transfer or removal from the refrigerator enclosure will be at its maximum. Increase of the current beyond the value $b$ will decrease the heat transfer because of the increasing effect of the joulean heat.

Superimposed on the above-described curves is curve 4 which represents the efficiency of the thermoelectric assembly and is plotted against the ordinate $\eta$. This efficiency curve will vary somewhat for various thermocouple structures but the curve is basically as illustrated in FIGURE 1. In FIGURE 1 it can be seen that the maximum efficiency of the thermoelectric assembly will occur at a current value of $a$. Thereafter the efficiency of the thermoelectric assembly gradually decreases as the current is increased.

It is thus apparent that under the same operating conditions two particular values of current I exist.

(1) Value $a$ at which the thermoelectric assembly operates at its peak of efficiency;

(2) Value $b$ at which the thermoelectric assembly transfers the greatest quantity of heat.

Figure 2:
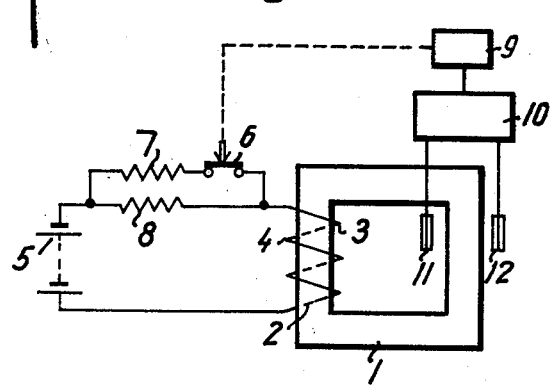
FIGURE 2 is a schematic diagram of the elements comprising the structure of the present invention.

Proceeding next to FIGURE 2 there is illustrated schematically a household refrigerator which is operable by the disclosed process. This structure comprises a refrigerator enclosure 1 having a thermoelectric assembly generally indicated at 2 and comprising a plurality of dissimilar thermoelectric elements electrically connected to provide a plurality of cold junctions 3 and a plurality of hot junctions 4. The cold junctions 3 are positioned in the interior of the enclosure 1 whereas the hot junctions are mounted on the exterior of the enclosure so as to contact the atmosphere surrounding the refrigerator. The thermoelectric assembly is connected to a suitable source of electric current indicated at 5.

A relay switch 6 is provided which, when closed, provides for a greater electric current to be passed through the thermoelectric assembly than when the switch is open by switching either resistances 7 or 8 into the circuit. The switch 6 is connected to a temperature-responsive relay 9 which is connected to a suitable instrument 10 for measuring the temperature difference as recorded by temperature-sensing elements 11 and 12. The elements 11 and 12 are positioned inside and outside of the enclosure 1 respectively. The switch 6 is thus responsive to the temperature differential between the interior of the refrigerator enclosure 1 and the atmosphere. The instrument 10 may be eliminated when the switch 6 is responsive to the temperature of the enclosure or an object disposed therein which is contacted by the temperature-sensing element 11. The temperature-sensing elements are conventional, such as bimetallic devices, thermoelectric elements, and the like.

Each thermoelectric element of the thermoelectric assembly is eight millimeters in length and has a diameter of seven millimeters. The number of elements to be employed is determined by the cooling capacity desired. In operation, the cold junctions are at a temperature of 0° C. and the hot junctions at a temperature of 40° C. However, this invention is not limited by particular sizes and compositions of thermoelectric elements.

In order to carry out the above-described process, an object is placed in the enclosure wherein the object is to be reduced to a temperature of $T_1$. The switch 6 is then adjusted so as to operate at the temperature $T_1$. A current $b$ is then passed through the thermoelectric assembly with the current $b$ being such that the maximum of transfer of heat occurs. As soon as the object within the enclosure 1 reaches the temperature $T_1$, the switch 6 is actuated and a current $a$ is then passed through the thermoelectric assembly. The current $a$ is that value at which the thermoelectric assembly operates most efficiently. Thus, the object is cooled down to its desired temperature in a very short period of time but this temperature is maintained at the most economical conditions by operating the thermoelectric assembly at its most efficient current.

A further switch which is not shown in the drawings but which is also responsive to temperature may also be provided in order to shut off the current flowing through the thermoelectric assembly in the event that the temperature of the object will be reduced below the value $T_1$ even when the thermoelectric assembly is operated at current $a$.

The same procedures as pointed out above would also be followed when the process is to be used in heating a room or for heating an object above ambient temperature.

In order to avoid undercooling or overheating of the object when carrying out the above-described process, it is preferable to use as temperatures of the bodies those temperatures at the junctions which are in good heat-conducting relationship with the body or the temperatures on the bodies themselves.

In those applications wherein a closed space is to be cooled or heated, such as in a refrigerator, or in a room, the temperature of the two bodies should be the temperature of the enclosure and the ambient temperature.

In those applications where the two bodies are flowing fluids such as liquids or gases, then the temperatures of the bodies should be the temperatures of these fluids.

Figure 3:
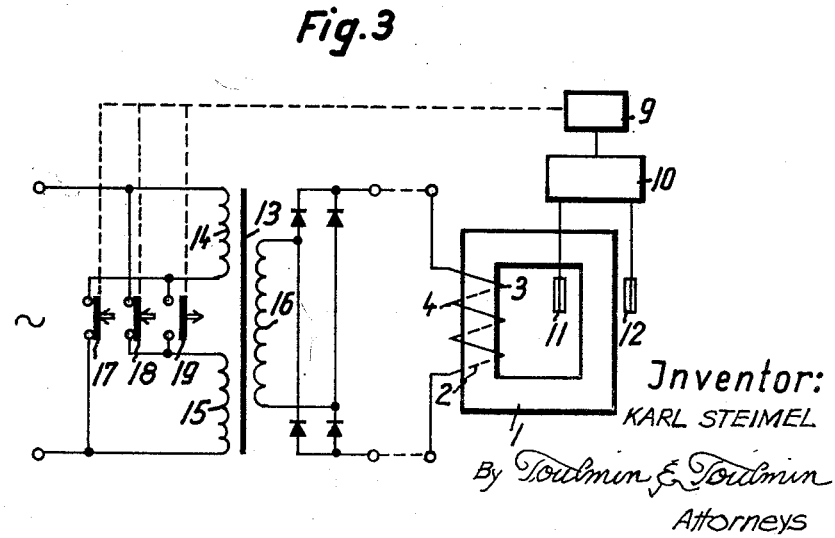
FIGURE 3 is a schematic diagram of the electric circuit when an alternating current source is used to energize the thermoelectric assembly.

A modification of the invention is shown in FIGURE 3 for utilizing an alternating current source for energizing the thermoelectric assembly. In this modification a transformer 13 has primary windings 14 and 15 for connection to the source, and the output of the transformer at the secondary winding 16 is connected to a suitable rectifier and filter circuit, if desired, neither of which is shown in the drawing. The thermoelectric assembly is then connected to the rectifier and filter circuits which are used.

The two primary windings of the transformer can be switched into either a series or parallel connection by means of relay switches 17, 18 and 19 which are connected to temperature-responsive relays as shown in FIGURE 2. Thus, the connection of the primary windings of the transformer will determine the current flowing through the thermoelectric assembly. The particular connection of the windings, i.e., series or parallel, will be determined by whether the higher or lower current is desired to be passed through the thermoelectric assembly.

It is pointed out that the several curves illustrated in FIGURE 1 may vary somewhat for different sizes of thermoelectric assemblies and for different designs thereof. However, the basic shapes of the curves will be similar and hence this process can also be applied to many different forms of thermoelectric assemblies and applications thereof.

Thus it can be seen that the present invention provides a method for regulating a heat transfer arrangement operating under the Peltier effect wherein the arrangement can be operated under the most economical conditions. In addition, this invention discloses a simplified structure for regulating the current flowing through a thermoelectric assembly utilized in the transfer of heat between two bodies at different temperatures.

It will be understood that this invention is susceptible to modification in order to adapt it to different usages and conditions and, accordingly, it is desired to comprehend such modifications within this invention as may fall within the scope of the appended claims.

What is claimed as this invention is:

1. A process for regulating the transfer of heat between two bodies so as to maintain preselected temperature conditions as between the two bodies by utilizing a thermoelectric assembly having a plurality of dissimilar thermoelectric elements electrically connected to provide a plurality of hot junctions in one body and a plurality of cold junctions in the other body upon the passage therethrough of electric current in a predetermined direction; and comprising the steps of determining a deviation from said preselected temperature conditions requiring such a heat transfer between said two bodies so as to restore said preselected temperature conditions passing an electric current through the thermoelectric assembly in a predetermined direction to effect the transfer of heat between the bodies until said predetermined temperature conditions of the bodies are restored with the current being that at which the maximum quantity of heat is transferred by the thermoelectric assembly, and subsequently passing through the thermoelectric assembly in a predetermined direction an electric current at which the assembly operates most efficiently.

2. A process for regulating the transfer of heat between two bodies so as to maintain preselected temperature conditions as between the two bodies by utilizing a thermoelectric assembly having a plurality of dissimilar thermoelectric elements electrically connected to provide a plurality of hot junctions in one body and a plurality of cold junctions in the other body upon the passage therethrough of electric current in a predetermined direction; and comprising the steps of determining a deviation from said preselected temperature conditions requiring such a heat transfer between said two bodies so as to restore said preselected temperature conditions, passing an electric current through the thermoelectric assembly in a predetermined direction to effect the transfer of heat between the bodies until said predetermined temperature conditions of the bodies are restored with the electric current being that at which the maximum quantity of heat is transferred by the thermoelectric assembly subsequently passing through the thermoelectric assembly in a predetermined direction an electric current at which the assembly operates most efficiently, and stopping the passage of electric current through the thermoelectric assembly when the predetermined temperature conditions are exceeded beyond predetermined limits.

3. A process for regulating the transfer of heat as claimed in claim 1 wherein said preselected temperature conditions comprise a predetermined temperature of one of said bodies.

4. A process for regulating the transfer of heat as claimed in claim 1 wherein said preselected temperature conditions comprise a predetermined temperature difference between the bodies.

5. A process for regulating the transfer of heat between an enclosure and the surrounding atmosphere so as to maintain predetermined temperature conditions in said enclosure through the utilization of a thermoelectric assembly having a plurality of dissimilar thermoelectric elements connected to provide a plurality of hot junctions in the surrounding atmosphere and a plurality of cold junctions within the enclosure upon the passage therethrough of electric current in a predetermined direction; and comprising the steps of determining a deviation from said predetermined conditions requiring cooling of said enclosure; passing an electric current through the thermoelectric assembly in a predetermined direction to effect the transfer of heat from the enclosure to the surrounding atmosphere until predetermined temperature conditions of the enclosure and atmosphere are attained with the electric current being, that at which the maximum quantity of heat is transferred by the thermoelectric assembly, the temperature of the enclosure and the ambient temperature being determinative of the said temperature relationship, and subsequently passing through the thermoelectric assembly an electric current at which the assembly operates most efficiently.

6. A refrigerator comprising an enclosure, a thermoelectric assembly on said enclosure and comprising a plurality of dissimilar thermoelectric elements electrically connected to provide a plurality of hot junctions exposed to the surrounding atmosphere and a plurality of cold junctions within said enclosure upon the passage therethrough of electric current in a predetermined direction, means for passing through said thermoelectric assembly in a predetermined direction an electric current at which the thermoelectric assembly transfers the maximum quantity of heat, and means for passing through said thermoelectric assembly in a predetermined direction an electric current at which the thermoelectric assembly operates most efficiently when predetermined temperature conditions of said enclosure are attained.

7. A refrigerator comprising an enclosure, a thermoelectric assembly on said enclosure and comprising a plurality of dissimilar thermoelectric elements electrically connected to provide a plurality of hot junctions exposed to the surrounding atmosphere and a plurality of cold junctions within said enclosure upon the passage therethrough of electric current in a predetermined direction, means for passing through said thermoelectric assembly in a predetermined direction an electric current greater than the current at which the thermoelectric assembly operates most efficiently, means for passing through said thermoelectric assembly in a predetermined direction an electric current at which the thermoelectric assembly operates most efficiently when predetermined temperature conditions of said enclosure are attained, and means for stopping the passage of electric current through said thermoelectric assembly when said temperature conditions are exceeded by a predetermined amount.

8. A refrigerator comprising an enclosure, a thermoelectric assembly on said enclosure and comprising a plurality of dissimilar thermoelectric elements electrically connected to provide a plurality of hot junctions exposed to the surrounding atmosphere and a plurality of cold junctions within said enclosure upon the passage therethrough of electric current in a predetermined direction, means for passing through said thermoelectric assembly in a predetermined direction an electric current greater than the current at which the thermoelectric assembly operates most efficiently, said current passing means including a transformer having two primary windings therein and a rectifier, means for passing through said thermoelectric assembly an electric current at which the thermoelectric assembly operates most efficiently when predetermined temperature conditions of said enclosure are attained, said current passing means comprising a temperature-responsive switch for switching the primary windings into one of parallel and series connections depending on the current to be passed through said thermoelectric assembly.

9. A device for automatically regulating the transfer of heat between a first and a second body comprising: a plurality of dissimilar thermoelectric elements electrically connected to provide a plurality of hot junctions in heat conductive relationship with said first body, and to further provide a plurality of cold junctions in heat-conductive relationship with said second body, means for sensing the temperature conditions of at least one of said bodies; means for passing through said thermoelectric elements an electric current at which said elements operate most efficiently to maintain predetermined temperature conditions; and means connected to said sensing means for passing through said thermoelectric elements an electric current at which said elements transfer the maximum quantity of heat, whenever said sensing means senses a deviation from said predetermined conditions requiring such heat transfer so as to restore said predetermined conditions.

10. A device for regulating the transfer of heat as claimed in claim 9 wherein the temperatures of those portions of the junctions which are in good heat-conducting relationship to their respective bodies are determinative of the temperature conditions.

References Cited in the file of this patent
UNITED STATES PATENTS
2,998,707    Meese et al. _____ Sept. 5, 1961